(12) United States Patent
Fukushima et al.

(10) Patent No.: US 11,545,176 B2
(45) Date of Patent: Jan. 3, 2023

(54) MAGNETIC RECORDING MEDIUM, MAGNETIC STORAGE APPARATUS, AND METHOD FOR MANUFACTURING MAGNETIC RECORDING MEDIUM

(71) Applicant: SHOWA DENKO K.K., Tokyo (JP)

(72) Inventors: Takayuki Fukushima, Chiba (JP); Tomoo Shige, Chiba (JP); Yuji Umemoto, Chiba (JP); Kazuya Niwa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/658,003

(22) Filed: Apr. 5, 2022

(65) Prior Publication Data
US 2022/0358962 A1 Nov. 10, 2022

(30) Foreign Application Priority Data
May 10, 2021 (JP) .............................. JP2021-079564

(51) Int. Cl.
*G11B 5/00* (2006.01)
*G11B 11/105* (2006.01)
*G11B 5/65* (2006.01)
*G11B 5/012* (2006.01)
*G11B 5/127* (2006.01)

(52) U.S. Cl.
CPC .............. *G11B 5/653* (2013.01); *G11B 5/012* (2013.01); *G11B 5/127* (2013.01); *G11B 5/656* (2013.01)

(58) Field of Classification Search
CPC ........... G11B 1/125; G11B 5/127; G11B 5/31; G11B 5/6047; G11B 11/10506; G11B 11/1051; G11B 11/10; G11B 11/105; G11B 2005/0021
USPC ..................................... 360/328, 324, 59, 75
See application file for complete search history.

(56) References Cited

U.S. PATENT DOCUMENTS 6,493,164 B1 * 12/2002 Kikitsu ................... G11B 5/00
360/59

FOREIGN PATENT DOCUMENTS

JP    2016-026368    2/2016

OTHER PUBLICATIONS

Jinyu Deng et al., "Lattice-Mismatch-Induced Oscillatory Feature Size and Its Impact on the Physical Limitation of Grain Size", Physical Review Applied 9, 034023(2018), Mar. 23, 2018.

* cited by examiner

*Primary Examiner* — Nabil Z Hindi
(74) *Attorney, Agent, or Firm* — IPUSA, PLLC (57) ABSTRACT

A magnetic recording medium includes a substrate, and a magnetic recording layer including magnetic grains having an $L1_0$ structure. The magnetic recording layer is (001) oriented, and a surface of growth of the magnetic recording layer includes a (001) plane, a (111) plane, and planes equivalent to the (111) plane. An area ratio of the (111) plane and the planes equivalent to the (111) plane, represented by $(A_{111}+A_{111e})/(A_{001}+A_{111}+A_{111e})$, is in a range of 0.2 to 0.7, where $A_{111}$ denotes an area of the (111) plane, $A_{111e}$ denotes an area of the planes equivalent to the (111) plane, and $A_{001}$ denotes an area of the (001) plane.

10 Claims, 3 Drawing Sheets

MAGNETIC RECORDING MEDIUM, MAGNETIC STORAGE APPARATUS, AND METHOD FOR MANUFACTURING MAGNETIC RECORDING MEDIUM

CROSS-REFERENCE TO RELATED APPLICATIONS

This application is based upon and claims priority to Japanese Patent Application No. 2021-079564 filed on May 10, 2021, the entire contents of which are incorporated herein by reference.

BACKGROUND OF THE INVENTION

1. Field of the Invention

The present disclosure relates to magnetic recording media, magnetic storage apparatuses, and methods for manufacturing magnetic recording media.

2. Description of the Related Art

The magnetic recording medium generally includes a substrate, and a magnetic recording layer laminated on the substrate. Methods for magnetically recording information on the magnetic recording medium include a thermal assist recording method which irradiates laser light on the magnetic recording medium, and a microwave assist recording method which irradiates microwave on the magnetic recording medium, to locally reduce the coercivity when magnetically recording the information, respectively. Because these assist recording methods can realize a high surface recording density on the order of 2 Tbit/inch$^2$, these assist recording methods are regarded as promising next-generation recording methods which can increase the storage capacity while coping with the demands to reduce the size and to increase the recording density of the magnetic recording medium.

According to such assist recording methods, it is possible to use a magnetic recording medium including a magnetic recording layer having a coercivity that is several tens of kOe at room temperature. For this reason, it is possible to use magnetic grains having a high magnetocrystalline anisotropy constant Ku (hereinafter also referred to as "high-Ku magnetic grains"), as the magnetic grains included in the magnetic recording layer. Known high-Ku magnetic grains include magnetic grains having an $L1_0$ structure, such as FePt alloy grains having a Ku of approximately $7\times10^6$ J/m$^3$, and CoPt alloy grains having a Ku of approximately $5\times10^6$ J/m$^3$.

An example of the magnetic recording medium which includes the magnetic recording layer having the high-Ku magnetic grains, may include a plurality of underlayers, such as MgO underlayers or the like, formed on the substrate. The magnetic layer is disposed above the plurality of underlayers, and includes FePt or CoPt having the $L1_0$ structure as a main component thereof, as proposed in Japanese Laid-Open Patent Publication No. 2016-026368, for example.

Further, there are reports that facets of the (111) plane appear on side surface of the FePt grains on the MgO underlayer, as reported in Jinyu Deng et al., "Lattice-Mismatch-Induced Oscillatory Feature Size and Its Impact on the Physical Limitation of Grain Size", PHYSICAL REVIEW APPLIED 9, 034023(2018), for example.

When writing information in a magnetic layer forming the magnetic recording layer of the magnetic recording medium, the magnetic layer is magnetized in units of magnetic grains. For this reason, it is important to reduce the size of the magnetic grains in order to increase the recording density of the magnetic recording medium. On the other hand, a crystalline nucleation density of the magnetic grains is high at an early stage of growth of the magnetic layer, but after a mid stage of the growth, the magnetic grains bind to each other. As a result, there are problems in that the crystalline nucleation density decreases to increase the crystal grain diameter, to thereby coarsen the magnetic grains.

SUMMARY OF THE INVENTION

One object according to one aspect of embodiments of the present disclosure is to provide a magnetic recording medium which can include magnetic grains having an extremely small crystal grain diameter at a surface of a magnetic recording layer and in a neighboring region near the surface of the magnetic recording layer.

One aspect of the embodiments of the present disclosure provides a magnetic recording medium including a substrate; and a magnetic recording layer including magnetic grains having an $L1_0$ structure, wherein the magnetic recording layer is (001) oriented, a surface of growth of the magnetic recording layer includes a (001) plane, a (111) plane, and planes equivalent to the (111) plane, and an area ratio of the (111) plane and the planes equivalent to the (111) plane, represented by $(A_{111}+A_{111e})(A_{001}+A_{111}+A_{111e})$, is in a range of 0.2 to 0.7, where $A_{111}$ denotes an area of the (111) plane, $A_{111e}$ denotes an area of the planes equivalent to the (111) plane, and $A_{001}$ denotes an area of the (001) plane.

Another aspect of the embodiments of the present disclosure provides a magnetic recording medium including a substrate; and a magnetic recording layer including magnetic grains having an $L1_0$ structure, wherein the magnetic recording layer is (001) oriented, a surface of growth of the magnetic recording layer includes a (001) plane, a (111) plane, and planes equivalent to the (111) plane, and a kurtosis Rku at the surface of growth is in a range of 4 to 5.

A further aspect of the embodiments of the present disclosure provides a method for manufacturing a magnetic recording medium, including forming a (001) oriented magnetic recording layer including magnetic grains having an $L1_0$ structure on a substrate, so that a (001) plane, a (111) plane, and planes equivalent to the (111) plane are formed as a surface of growth, and an area ratio of the (111) plane and the planes equivalent to the (111) plane, represented by $(A_{111}+A_{111e})/(A_{001}+A_{111}+A_{111e})$, is in a range of 0.2 to 0.7, where $A_{111}$ denotes an area of the (111) plane, $A_{111e}$ denotes an area of the planes equivalent to the (111) plane, and $A_{001}$ denotes an area of the (001) plane; forming a protective film on the magnetic recording layer; and polishing a surface of the protective film so that a kurtosis Rku thereof is in a range of 2.5 to 3.5.

Another aspect of the embodiments of the present disclosure provide a method for manufacturing the magnetic recording medium, including forming a (001) oriented magnetic recording layer including magnetic grains having an $L1_0$ structure on a substrate, so that a (001) plane, a (111) plane, and planes equivalent to the (111) plane are formed as a surface of growth, so that a kurtosis Rku of the surface of growth is in a range of 4 to 5; forming a protective film on the magnetic recording layer; and polishing a surface of the protective film so that a kurtosis Rku thereof is in a range of 2.5 to 3.5.

Other objects and further features of the present disclosure will be apparent from the following detailed description when read in conjunction with the accompanying drawings.

DESCRIPTION OF THE PREFERRED EMBODIMENTS

Hereinafter, embodiments of the present disclosure will be described in detail. In order to facilitate understanding of the description, the same constituent elements in the drawings are designated by the same reference numerals, and a repeated description of the same constituent elements may be omitted. In addition, the constituent elements in the drawings may be not be drawn to actual scale, and the scale may differ among the figures. A "range from A to B" refers to a range including a lower limit value A and an upper limit value B of the range, unless otherwise indicated.

<Magnetic Recording Medium>

A magnetic recording medium according to one embodiment according to the present disclosure includes a substrate, and a magnetic recording layer provided on the substrate and including magnetic grains made of a magnetic material having an $L1_0$ structure. The magnetic recording layer is (001) oriented. By causing the (001) orientation of the magnetic grains having the $L1_0$ structure and included in the magnetic recording layer, the magnetic recording layer can have a high degree of ordering.

In the present embodiment, when growing the magnetic grains with the (001) orientation, a surface of growth of the magnetic recording layer includes a (001) plane, and a (111) plane and equivalent planes thereof.

Figure 1:
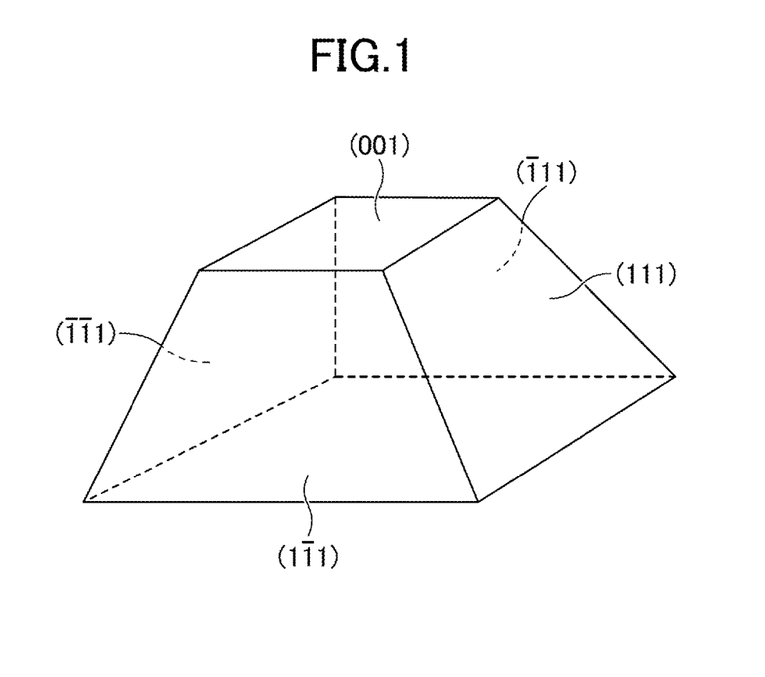
FIG. 1 is a schematic diagram illustrating crystal planes of magnetic grains having an $L1_0$ structure when the magnetic grains are (001) oriented.

FIG. 1 is a schematic diagram illustrating crystal planes of the magnetic grains having the $L1_0$ structure when the magnetic grains are (001) oriented. When the magnetic grains having $L1_0$ structure are grown to include the (001) plane and the (111) plane, a frustum crystal illustrated in FIG. 1 is obtained, which includes a (-111) plane, a (1-11) plane, and a (-1-11) plane, as equivalent planes of the (111) plane. When the magnetic grains are grown so that the (001) plane does not appear, a quadrangular pyramid crystal is obtained. When the magnetic grains are grown so that the (111) plane does not appear, a flat square crystal only having the (001) plane is obtained.

In the present embodiment, an area ratio of the (111) plane and the planes equivalent to the (111) plane in the surface of growth, that is, a sum of an area $A_{111}$ of the (111) plane and an area $A_{111e}$ of the planes equivalent to the (111) plane, divided by a total area of an area $A_{001}$ of the (001) plane, the area $A_{111}$ of the (111) plane, and the area $A_{111e}$ of the planes equivalent to the (111) plane, is preferably in a range of 0.2 to 0.7. In other words, the area ratio $(A_{111}+A_{111e})/(A_{001}+A_{111}+A_{111e})$ is preferably in the range of 0.2 to 0.7, more preferably in a range of 0.25 to 0.6, and even more preferably in a range of 0.3 to 0.6. In the present embodiment, because the magnetic grains included in the magnetic recording layer have the structure described above, the binding of the magnetic grains can be reduced, to thereby reduce or prevent coarsening of the magnetic grains. For this reason, the magnetic recording medium can reduce the increase in the crystal grain diameter of the magnetic grains included in the magnetic recording layer.

When the area ratio of the (111) plane and the planes equivalent to the (111) plane is 0.2 or greater in the surface of growth, a distance between the (001) planes of adjacent magnetic grains becomes large, thereby reducing or preventing the binding of the (001) planes of the adjacent magnetic grains. On the other hand, when the area ratio of the (111) plane and the planes equivalent to the (111) plane is smaller than 0.2 in the surface of growth, the distance between the (001) planes of the adjacent magnetic grains decreases, and the (001) planes of the adjacent magnetic grains bind to each other, thereby more easily coarsening the magnetic grains. In addition, when the area ratio of the (111) plane and the planes equivalent to the (111) plane in the surface of growth becomes greater than 0.7, irregularities on the surface of growth become large, thereby deteriorating the surface smoothness of the magnetic recording medium. In this case, a floating stability (or flying stability) of a magnetic head on the surface of the magnetic recording medium deteriorates, thereby deteriorating the electromagnetic conversion characteristics.

An example of a method for manufacturing the magnetic recording medium according to the present embodiment will be described below.

In the magnetic recording medium according to the present embodiment, a magnetic layer included in the magnetic recording layer has a granular structure, for example. The granular structure includes the magnetic grains, and nonmagnetic grain boundaries located in peripheries of the magnetic grains. The granular structure can be obtained by gradually decreasing a volume ratio of the grain boundaries when depositing the magnetic layer. Moreover, the magnetic recording layer may have a multi-layer structure including multiple magnetic layers, and the volume ratio of the grain boundaries in each magnetic layer may be gradually reduced.

The magnetic recording layer may have the multi-layer structure including the multiple magnetic layers, and a vacuum heating step may be provided between deposition steps of adjacent magnetic layers. In the magnetic grains having the $L1_0$ structure, the (111) plane and the planes equivalent to the (111) plane are closest packing planes, and thus, a crystalline plane is easily exposed in vacuum. For this reason, it is possible to promote the growth of the magnetic grains, by subjecting the surface of growth of the magnetic grains to heating under vacuum.

The area ratio can be computed, by observing a cross section of the magnetic recording medium using a transmission electron microscope (TEM). In other words, because crystal planes having an inclination of approximately 53° with respect to the substrate surface are the (111) plane and the planes equivalent to the (111) plane, and a crystal plane horizontal with respect to the substrate surface is the (001) plane, the area ratio can be computed by observing the cross section using the TEM.

The area ratio of the (111) plane and planes equivalent to the (111) plane with respect to the (001) plane in the surface of growth can also be measured by an azimuth measurement of an atomic scattering surface analysis. In other words, a measuring sample to be measured is rotated in an azimuth direction, to measure a scattering intensity at each angle, and the area ratio of each crystal plane can be determined from an axial direction and symmetry of the surface of the measuring sample.

Figure 2:
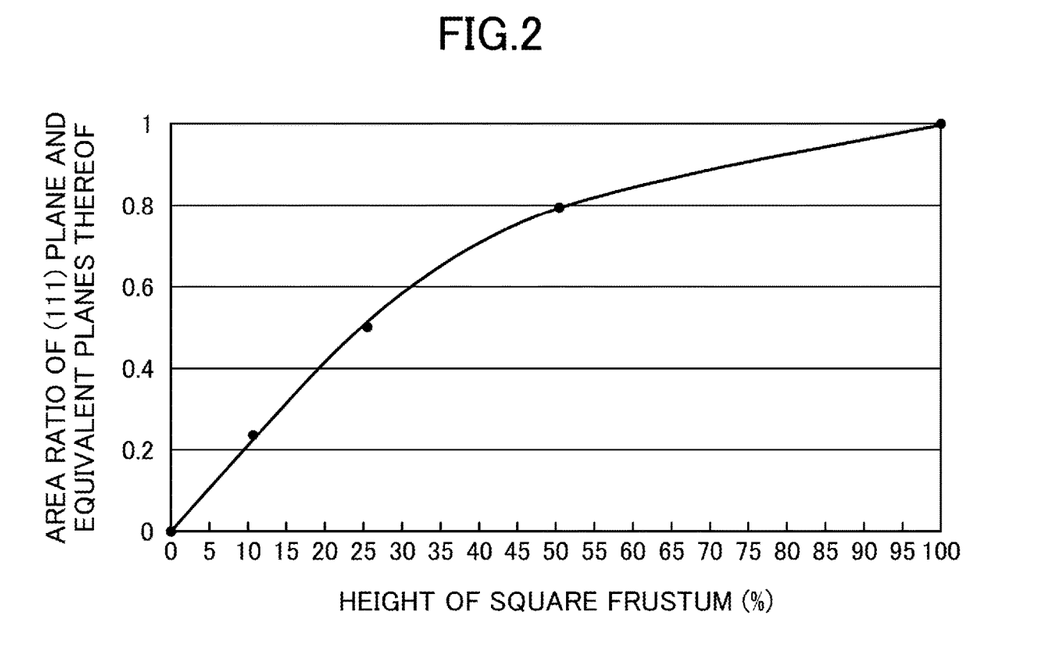
FIG. 2 is a diagram illustrating a relationship between a crystal shape (height of square frustum) of a FePt alloy which is used as the magnetic grains having the $L1_0$ structure, and an area ratio of (111) plane and equivalent planes thereof.

FIG. 2 illustrates a relationship between a crystal shape (height of square frustum) of a FePt alloy which is used as the magnetic grains having the $L1_0$ structure, and the area ratio of the (111) plane and the equivalent planes thereof. Because the (111) plane of the FePt alloy is an isosceles triangle having a base angle of 53° and a vertex angle of 74°, the crystal shape is a square pyramid when the height is 100% on the abscissa, and is a flat square when the height is zero on the abscissa.

Figure 3:
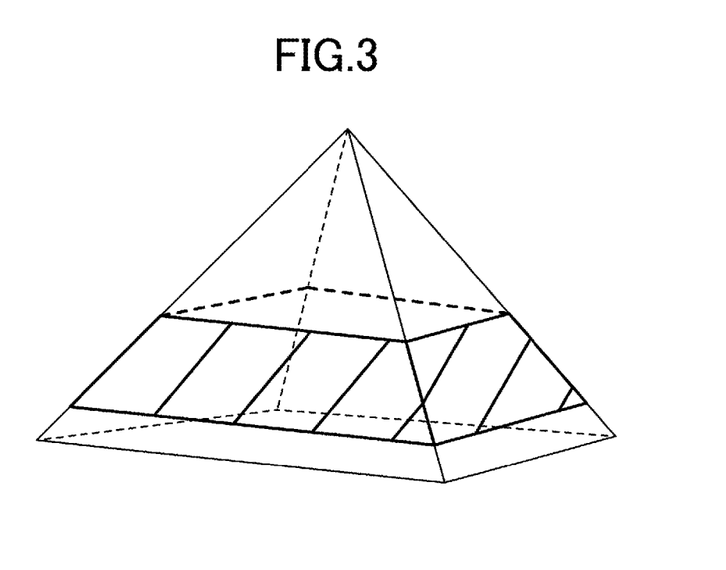
FIG. 3 is a diagram illustrating a region where the area ratio of the (111) plane and equivalent planes thereof is in a range of 0.2 to 0.7.

When the FePt alloy is used as the magnetic grains, the range of the area ratio of (111) plane and the planes equivalent to the (111) plane, which is 0.2 to 0.7, corresponds to a hatched portion in FIG. 3 located at a position of approximately 10% to approximately 40% on the ordinate from a bottom of the square pyramid. Hence, the area ratio can be computed, by observing the cross section of the magnetic recording medium with using the TEM, and measuring the height of the frustum forming the magnetic grains.

In addition, the magnetic recording medium according to the present embodiment can be prescribed by a kurtosis Rku. The kurtosis Rku represents average characteristics in a height direction, prescribed by Japanese Industrial Standards (JIS), International Organization for Standardization (ISO), or the like.

In other words, the magnetic recording medium according to the present embodiment has the magnetic recording layer, provided on the substrate, and including the magnetic grains having the $L1_0$ structure, and the magnetic grains are (001) oriented and have the (001) plane, the (111) plane, and the planes equivalent to the (111) plane, as the surface of growth thereof. Further, the magnetic grains have the kurtosis Rku in a range of 4 to 5 at the surface of growth.

The kurtosis Rku represents a sharpness of the irregularities of the crystal plane included in the magnetic grains. When the crystal plane has an average sharpness, the kurtosis Rku is 3 (Rku=3). When the crystal plane is not sharp, and is like a polished surface, the kurtosis Rku is less than 3 (Rku <3). When the crystal plane has sharp irregularities, the kurtosis Rku is greater than 3 (Rku >3).

According to studies conducted by the present inventors, the present inventors found that, when the magnetic layer including the magnetic grains having the $L1_0$ structure is (001) oriented so as to include the (001) plane, the (111) plane, and the planes equivalent to the (111) plane, and the area ratio $(A_{111}+A_{111e})/(A_{001}+A_{111}+A_{111e})$ of the (111) plane and the planes equivalent to the (111) plane in the surface of growth, that is, the sum of the area $A_{111}$ of the (111) plane and the area $A_{111e}$ of the planes equivalent to the (111) plane, divided by the total area of the area $A_{001}$ of the (001) plane, the area $A_{111}$ of the (111) plane, and the area $A_{111e}$ of the planes equivalent to the (111) plane, falls in the range of 0.2 to 0.7, and the kurtosis Rku of the surface of growth falls in the range of 4 to 5.

When the kurtosis Rku of the surface of growth of the magnetic grains included in the magnetic recording layer is less than 4, the magnetic grains bind to each other and the magnetic grains are coarsened. On the other hand, when the kurtosis Rku of the surface of growth of the magnetic grains is greater than 5, the surface of the magnetic recording layer becomes rougher, the surface smoothness of the magnetic recording medium deteriorates, and the electromagnetic conversion characteristics deteriorate.

The kurtosis Rku of the surface of growth of the magnetic recording layer can be computed by observing the cross section of the magnetic recording medium using the TEM. In addition, during the manufacturing process of the magnetic recording medium, it is possible to obtain a sample formed with the magnetic recording layer, and measure the kurtosis Rku of the surface of the sample using a general measuring device, such as a non-contact surface roughness meter or the like.

Figure 4:
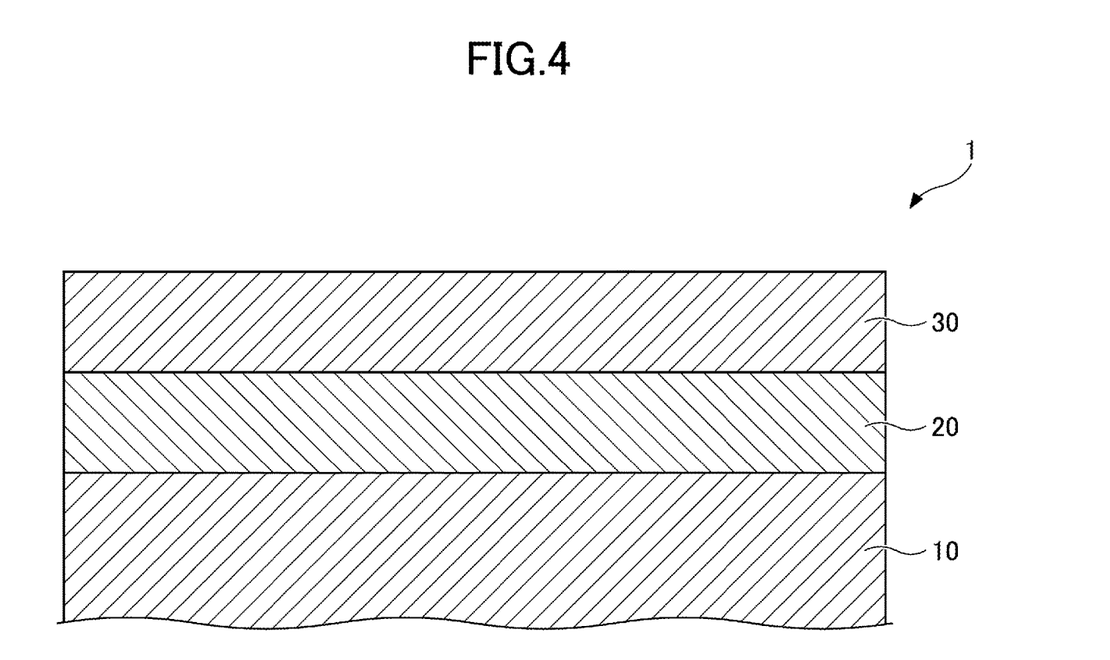
FIG. 4 is a diagram illustrating an example of a layer structure of a magnetic recording medium according to one embodiment.

FIG. 4 illustrates an example of the layer structure of the magnetic recording medium according to the present embodiment. As illustrated in FIG. 4, a magnetic recording medium 1 includes a substrate 10, an underlayer 20, and a magnetic recording layer 30.

A substrate that is generally used in magnetic recording media may be used as the substrate 10. For example, a heat resistant glass substrate having a softening temperature of 500° C. or higher, and preferably 600° C. or higher, is preferably used as the substrate 10. When manufacturing the magnetic recording medium 1, the substrate 10 may be heated to a temperature higher than or equal to 500° C. Hence, the heat resistant substrate is suited for use as the substrate 10 particularly when the substrate 10 is heated to the temperature higher than or equal to 500° during the manufacturing process.

The underlayer 20 includes a layer including MgO, and may have a multi-layer structure including other layers, provided that the underlayer 20 can cause the (001) orientation of the magnetic grains having the $L1_0$ structure included in the magnetic recording layer 30.

The underlayer 20 preferably includes a NaCl compound. The NaCl compound, other than MgO, includes TiO, NiO, TiN, TaN, HfN, NbN, ZrC, HfC, TaC, NbC, TiC, or the like, for example. One or an arbitrary combination of such NaCl compounds may be used for the underlayer 20.

The magnetic recording layer 30 includes the magnetic grains having the $L1_0$ structure. Examples of the magnetic grains having the $L1_0$ structure include FePt alloy grains, CoPt alloy grains, or the like, for example.

A crystal grain diameter (or crystal grain size) of the magnetic grains is preferably in a range of 3 nm to 10 nm, and more preferably in a range of 4 nm to 7 nm. The crystal grain diameter of the magnetic grains can be measured by observing a plane using the TEM.

A distance between the magnetic grains is preferably in a range of 4 nm to 12 nm, and more preferably in a range of 5 nm to 9 nm. The distance between the magnetic grains refers to the distance between centers of gravity of adjacent magnetic grains. The distance between the magnetic grains can be measured by observing a plane using the TEM. The distance between the magnetic grains is sometimes also referred to as a magnetic grain spacing, or a grain-to-grain distance or spacing.

The magnetic recording layer 30 may have a granular structure including grain boundaries.

In a case where the magnetic recording layer 30 has the granular structure, a content of the grain boundaries in the magnetic recording layer 30 is preferably in a range of 25 vol % to 50 vol %, and more preferably in a range of 35 vol % to 45 vol %. When the content of the grain boundaries in the magnetic recording layer 30 falls within the preferable range described above, it is possible to increase the anisotropy of the magnetic grains included in the magnetic recording layer 30.

The grain boundaries may include carbides, nitrides, oxides, borides, or the like, for example. More particularly, the grain boundaries may include BN, $B_4C$, C, $MoO_3$, $GeO_2$, or the like, for example.

Preferably, the magnetic grains are c-axis oriented, that is, (001) oriented, with respect to the substrate 10.

A thickness of the magnetic recording layer 30 is preferably in a range of 8 nm to 20 nm, more preferably in a range of 10 nm to 18 nm, and even more preferably in a range of 10 nm and 15 nm. When the thickness of the magnetic recording layer 30 falls within the preferable range described above, it is possible to achieve a high recording density.

In this specification, the thickness of the magnetic recording layer 30 refers to a length of the magnetic recording layer 30 along a direction perpendicular to a principal surface of the magnetic recording layer 30. The thickness of the magnetic recording layer 30 is the thickness measured at an arbitrary location in a cross section of the magnetic recording layer 30. When the thickness is measured at a plurality of arbitrary locations in the cross section of the magnetic recording layer 30, an average value of the thicknesses measured at the plurality of arbitrary locations may be regarded as the thickness of the magnetic recording layer 30. In the following, the thicknesses of other layers may be measured using a method similar to the method for measuring the thickness of the magnetic recording layer 30.

The magnetic recording layer 30 may be formed on the underlayer 20 by a sputtering method or the like.

The magnetic recording layer 30 may include a single magnetic layer, or may include multiple magnetic layers that are laminated. In a case where the magnetic recording layer 30 includes multiple magnetic layers, each of the multiple magnetic layers may be formed using the same type of material, or may be formed using different types of materials. In addition, a non-magnetic layer may be included between two adjacent magnetic layers. The non-magnetic layer may be formed using a material that is generally used in magnetic recording media.

The magnetic recording medium 1 preferably further includes a protective film provided on the magnetic recording layer 30.

Examples of the protective film include a hard carbon film or the like, for example.

Examples of methods for forming the protective film include radio frequency-chemical vapor deposition (RF-CVD) methods which decompose a hydrocarbon gas (source gas) by high-frequency plasma to deposit the protective film, ion beam deposition (IBD) methods which ionize the source gas by electrons emitted from a filament to deposit the protective film, filtered cathodic vacuum arc (FCVA) methods which use a solid carbon target, without using the source gas, to deposit the protective film, or the like, for example.

A thickness of the protective film is preferably in a range of 1 nm to 6 nm. When the thickness of the protective film is greater than or equal to 1 nm, excellent floating stability (or flying stability) of the magnetic head can be obtained. Further, when the thickness of the protective film is less than or equal to 6 nm, a magnetic spacing between the magnetic head and the magnetic recording layer is reduced, and a signal-to-noise ratio (SNR) of the magnetic recording medium 1 can be improved.

The magnetic recording medium 1 may further include a lubricant layer provided on the protective film.

The lubricant layer may be famed using a liquid lubricant layer. A liquid lubricant that is chemically stable, and has a low friction and a low sticking or adhering property is suited for use as the lubricant layer. A fluororesin-based lubricant, such as a perfluoro-polyether-based lubricant or the like including a compound having a perfluoropolyether structure, is preferably used for the lubricant layer.

A thickness of the lubricant layer is preferably in a range of 1 nm to 3 nm.

As described above, the magnetic recording medium according to the present embodiment includes the substrate, and the magnetic recording layer, provided on the substrate, and including the magnetic grains made of a magnetic material having the $L1_0$ structure. The magnetic recording layer is (001) oriented. The surface of growth of the magnetic recording layer includes the (001) plane, the (111) plane, and planes equivalent to the (111) plane, and the area ratio of the (111) plane and the equivalent planes thereof in the surface of growth is in the range of 0.2 to 0.7. Accordingly, the binding of the magnetic grains is reduced from an initial stage of growth to a later stage of growth of the magnetic grains, thereby reducing the increase in the crystal grain diameter and also reducing the coarsening of the magnetic grains of the magnetic recording layer. For this reason, it is possible to maintain the crystal grain diameter of the magnetic grains present in a surface layer (or upper layer) and a neighboring region near the surface layer of the magnetic recording layer, formed at the later stage of the growth of the magnetic grains, approximately the same as the crystal grain diameter of the magnetic grains present in a lower layer and a neighboring region near the lower layer of the magnetic recording layer, formed at the initial stage of the growth of the magnetic grains. Hence, the magnetic recording medium according to the present embodiment can include the magnetic grains having an extremely small crystal grain diameter in the upper layer and the neighboring region near the upper layer of the magnetic recording layer.

Because the magnetic recording medium according to the present embodiment can increase the surface smoothness of the surface of growth of the magnetic recording layer by making the crystal grain diameter of the magnetic grains present in the surface layer and the neighboring region near the surface layer of the magnetic recording layer extremely small, the magnetic recording medium can exhibit excellent electromagnetic conversion characteristics, such as an increased recording density or the like.

In addition, the magnetic recording medium according to the present embodiment includes the substrate, and the magnetic recording layer, provided on the substrate, and including the magnetic grains made of a magnetic material having the $L1_0$ structure. The magnetic recording layer is (001) oriented. The surface of growth of the magnetic recording layer includes the (001) plane, the (111) plane, and planes equivalent to the (111) plane, and a kurtosis Rku at the surface of growth is in the range of 4 to 5. In this case, it is possible to maintain the crystal grain diameter of the magnetic grains present in a surface layer (or upper layer) and a neighboring region near the surface layer of the magnetic recording layer, formed at the later stage of the growth of the magnetic grains, approximately the same as the crystal grain diameter of the magnetic grains present in a lower layer and a neighboring region near the lower layer of the magnetic recording layer, formed at the initial stage of the growth of the magnetic grains, similar to the above. Hence, the magnetic recording medium according to the present embodiment can include the magnetic grains having an extremely small crystal grain diameter in the upper layer and the neighboring region near the upper layer of the magnetic recording layer. Because the magnetic recording medium according to the present embodiment can increase the surface smoothness of the surface of growth of the magnetic recording layer by making the crystal grain diameter of the magnetic grains present in the surface layer and the neighboring region near the surface layer of the magnetic recording layer extremely small, the magnetic recording medium can exhibit excellent electromagnetic conversion characteristics, such as an increased recording density or the like.

The magnetic recording medium according to the present embodiment can include, in the magnetic recording layer, the magnetic grains having a crystal grain diameter less than or equal to 8 nm, and including at least one component selected from a group consisting of FePt, CoPt, FePd, and CoPd. For this reason, the magnetic recording medium according to the present embodiment can make the crystal grain diameter of the magnetic grains extremely small. Hence, the magnetic recording medium according to the present embodiment can have a further increased recording density.

The method for manufacturing the magnetic recording medium according to the present embodiment includes forming a (001) oriented magnetic recording layer including magnetic grains having an $L1_0$ structure on a substrate, so that a (001) plane, a (111) plane, and planes equivalent to the (111) plane are formed as a surface of growth, and an area ratio of the (111) plane and the equivalent planes thereof is in a range of 0.2 to 0.7. Then, a protective film is formed on the magnetic recording layer, and a surface of the protective film is polished so that a kurtosis Rku is in a range of 2.5 to 3.5. Accordingly, during the formation of the magnetic recording layer, the binding of the magnetic grains is reduced from the initial stage of growth to the later stage of growth of the magnetic grains, thereby reducing the increase in the crystal grain diameter, and also reducing the coarsening of the magnetic grains. For this reason, it is possible to maintain the crystal grain diameter of the magnetic grains present in a surface layer (or upper layer) and a neighboring region near the surface layer of the magnetic recording layer, formed at the later stage of the growth of the magnetic grains, approximately the same as the crystal grain diameter of the magnetic grains present in a lower layer and a neighboring region near the lower layer of the magnetic recording layer, formed at the initial stage of the growth of the magnetic grains, similar to the above. Hence, the magnetic recording medium according to the present embodiment can include the magnetic grains having an extremely small crystal grain diameter in the upper layer and the neighboring region near the upper layer of the magnetic recording layer. Because the method for manufacturing the magnetic recording medium according to the present embodiment can increase the surface smoothness of the surface of growth of the magnetic recording layer by making the crystal grain diameter of the magnetic grains present in the surface layer and the neighboring region near the surface layer of the magnetic recording layer extremely small, the magnetic recording medium can exhibit excellent electromagnetic conversion characteristics, such as an increased recording density or the like.

In addition, the method for manufacturing the magnetic recording medium according to the present embodiment includes forming a (001) oriented magnetic recording layer including magnetic grains having an $L1_0$ structure on a substrate, so that a (001) plane, a (111) plane, and planes equivalent to the (111) plane are formed as a surface of growth, and a kurtosis Rku at the surface of growth is in the range of 4 to 5. Then, a protective film is formed on the magnetic recording layer, and a surface of the protective film is polished so that a kurtosis Rku is in a range of 2.5 to 3.5. In this case, it is possible to maintain the crystal grain diameter of the magnetic grains present in a surface layer (or upper layer) and a neighboring region near the surface layer of the magnetic recording layer, formed at the later stage of the growth of the magnetic grains, approximately the same as the crystal grain diameter of the magnetic grains present in a lower layer and a neighboring region near the lower layer of the magnetic recording layer, formed at the initial stage of the growth of the magnetic grains, similar to the above. Hence, the magnetic recording medium according to the present embodiment can include the magnetic grains having an extremely small crystal grain diameter in the upper layer and the neighboring region near the upper layer of the magnetic recording layer. Because the method for manufacturing the magnetic recording medium according to the present embodiment can increase the surface smoothness of the surface of growth of the magnetic recording layer by making the crystal grain diameter of the magnetic grains present in the surface layer and the neighboring region near the surface layer of the magnetic recording layer extremely small, the magnetic recording medium can exhibit excellent electromagnetic conversion characteristics, such as an increased recording density or the like.

Because the magnetic recording medium 1 according to the present embodiment has the characteristics described above, the magnetic recording medium 1 can be used while reducing collisions between the magnetic head 4 and the magnetic recording medium 1, even when the distance between the magnetic head 4 and the magnetic recording medium 1 becomes narrow and a floating amount of the magnetic head 4 from the magnetic recording medium 1 is further reduced. Hence, the magnetic recording medium 1 is suited for use in a magnetic storage apparatus having an even higher recording density.

The magnetic recording medium 1 may include an arbitrary layer, in addition to the protective film and the lubricant layer, as appropriate. For example, the magnetic recording medium 1 may be provided with an adhesive layer, a soft magnetic underlayer, an orientation control layer, or the like between the substrate 10 and the magnetic recording layer 30, as appropriate. The soft magnetic underlayer may include a first soft magnetic layer, an intermediate layer, and a second soft magnetic layer, for example. The orientation control layer may be formed by a single layer or multiple layers (for example, a first orientation control layer, a second orientation control layer, or the like). The adhesive layer, the soft magnetic underlayer, the orientation control layer, or the like may be formed using materials that are generally used in magnetic recording media.

<Magnetic Storage Apparatus>

A magnetic storage apparatus using the magnetic recording medium according to the present embodiment will be described. A configuration of the magnetic storage apparatus according to the present embodiment is not particularly limited, as long as the magnetic recording medium according to the present embodiment is provided. Hereinafter, an example will be described in which the information is magnetically recorded on the magnetic recording medium by the magnetic storage apparatus employing the thermal assist recording method.

The magnetic storage apparatus according to the present embodiment may include a medium driving device for rotating the magnetic recording medium according to the present embodiment, a magnetic head having a near-field light generating element on a tip end thereof, a head driving device for moving the magnetic head, and a signal processor for processing signals recorded on and reproduced from the magnetic recording medium, for example.

The magnetic head employs the thermal assist recording method, and includes a laser light generator for heating the magnetic recording medium, and a waveguide for guiding laser light generated from the laser light generator to the near-field light generating element, for example.

Figure 5:
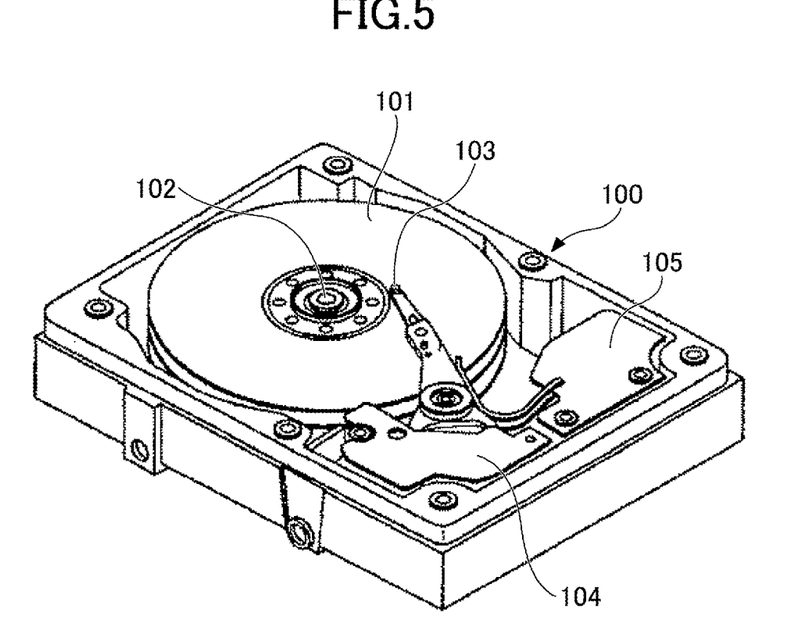
FIG. 5 is a perspective view illustrating an example of a magnetic storage apparatus using the magnetic recording medium according to one embodiment.

FIG. 5 is a perspective view illustrating an example of the magnetic storage apparatus using the magnetic recording medium according to the present embodiment. As illustrated in FIG. 5, a magnetic storage apparatus 100 may include a magnetic recording medium 101, a medium driving device 102 for rotating the magnetic recording medium 101, a magnetic head 103 having a near-field light generating element on a tip end thereof, a head driving device 104 for moving the magnetic head 103, and a signal processor 105. The magnetic recording medium 1 according to the embodiment described above may be used as the magnetic recording medium 101.

Figure 6:
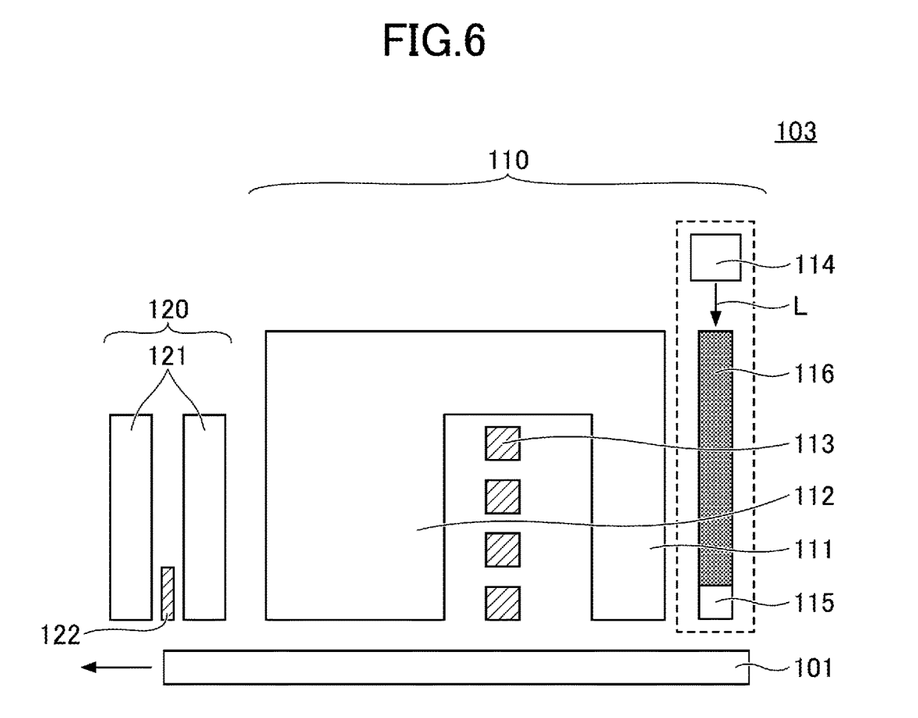
FIG. 6 is a schematic diagram illustrating an example of a magnetic head.

FIG. 6 is a schematic diagram illustrating an example of the magnetic head 103. As illustrated in FIG. 6, the magnetic head 103 includes a recording head 110, and a reproducing head 120.

The recording head 110 has a main pole 111, an auxiliary pole 112, a coil 113 for generating a magnetic field, a laser diode (LD) 114 as the laser light generator, and a waveguide 116 for transmitting laser light L generated from the LD 114 to the near-field light generating element 115.

The reproducing head 120 includes a pair of shields 121, and a reproducing element 122 sandwiched between the pair of shields 121.

As illustrated in FIG. 6, in the magnetic storage apparatus 100, a center portion of the magnetic recording medium 101 is attached to a rotation shaft of a spindle motor, and the information is recorded on or reproduced from the magnetic recording medium 101, which is driven and rotated by the spindle motor, while the magnetic head 103 moves over the surface of the magnetic recording medium 101 in a floating state.

The magnetic storage apparatus 100 according to the present embodiment can increase the recording density by using, as the magnetic recording medium 101, the magnetic recording medium 1 according to the present embodiment which can achieve a high-density recording.

Of course, a magnetic head that employs the microwave assist recording method may be used in place of the magnetic head 103 employing the thermal assist recording method.

[Exemplary Implementations]

Hereinafter, the embodiment will be specifically described by referring to exemplary implementations and comparative examples, however, the present disclosure is not limited to the embodiment and exemplary implementations.

<Manufacturing Magnetic Recording Medium>

[Exemplary Implementation EI1]

The magnetic recording medium according to an exemplary implementation EI1 was manufactured by the following method.

An underlayer was deposited on a MgO single crystal substrate having an exposed (100) plane. More particularly, a Cr-50 at % Ti alloy layer having a thickness of 100 nm, and a Co-27 at % Fe-5at % Zr-5-at % B alloy layer having a thickness of 30 nm were successively laminated on the MgO single crystal substrate in this order, as the underlayer. Next, after heating the substrate to 250° C., a Cr film having a thickness of 10 nm, and a MgO—C layer having a thickness of 5 nm were successively formed on the underlayer. Next, after heating the MgO single crystal substrate to 450° C., a FePt-40 mol % C first magnetic layer having a thickness of 1 nm was deposited. Next, after annealing the MgO single crystal substrate in a high-vacuum of $10^{-5}$ Pa for 20 seconds at a temperature of 650° C., a FePt-40 mol % C second magnetic layer having a thickness of 2 nm was deposited. Thereafter, a FePt-16SiO$_2$ third magnetic layer having a thickness of 3 nm was deposited, a FePt-25BN fourth magnetic layer having a thickness of 2 nm was deposited, and the MgO single crystal substrate was annealed at 3 Pa for 20 seconds at a temperature of 550° C., before depositing a FePt-16 SiO$_2$ fifth magnetic layer having a thickness of 5 nm. The first through fifth magnetic layers were deposited as the magnetic recording layer.

Thereafter, an average grain diameter of the magnetic grains, an average distance between adjacent magnetic grains, the area ratio of the (111) plane and equivalent planes thereof, and the kurtosis Rku were measured at the surface of the magnetic recording layer, that is, at a surface of the fifth magnetic layer. In this specification, the average grain diameter of the magnetic grains may simply be referred to as the "crystal grain diameter" of the magnetic grains, and the average distance between the adjacent magnetic grains may simply be referred to as the "magnetic grain spacing", as in Table 1. The area ratio of the (111) plane and equivalent planes thereof can be represented by $(A_{111}+A_{111e})/(A_{001}+A_{111}+A_{111e})$, where $A_{111}$ denotes the area of the (111) plane, $A_{111e}$ denotes the area of the planes equivalent to the (111) plane, and $A_{001}$ denotes the area of the (001) plane.

Next, a carbon film having a thickness of 3 nm was formed as the protective film. Thereafter, the surface of the protective film was polished using an alumina tape having alumina abrasive grains having an average grain diameter of 1 μm adhered thereon. Conditions during the polishing process include a rotation speed of the substrate set to 500 revolutions per minute, a pressing force of the alumina tape on the substrate set to 0.1 MPa, and a polishing time set to 3 seconds. Then, the kurtosis Rku of the polished surface of the protective film after the polishing process was measured.

Table 1 illustrates measurement results of the crystal grain diameter (or average grain diameter) of the magnetic grains, the magnetic grain spacing (or average distance between the adjacent magnetic grains), the area ratio of the (111) plane and equivalent planes thereof, and the kurtosis Rku at the surface of the magnetic recording layer, and the kurtosis Rku of the polished surface of the protective film after the polishing process.

[Exemplary Implementations EI2 through EI11, and Comparative Examples Cmp1 through Cmp7]

The magnetic recording media according to exemplary implementations EI2 through EI11 and comparative examples Cmp1 through Cmp7 were manufactured by varying the manufacturing conditions from those of the magnetic recording medium according to the exemplary implementation EI1, as illustrated in Table 1. Otherwise, the magnetic recording media according to exemplary implementations EI2 through EI11 and comparative examples Cmp1 through Cmp7 were evaluated in the same manner as the exemplary implementation EI1. Table 1 illustrates the measurement results of the crystal grain diameter (or average grain diameter) of the magnetic grains, the magnetic grain spacing (or average distance between the adjacent magnetic grains, the area ratio of the (111) plane and equivalent planes thereof, and the kurtosis Rku at the surface of the magnetic recording layer, and the kurtosis Rku of the polished surface of the protective film after the polishing process, for each of the exemplary implementations EI1 through EI11 and the comparative examples Cmp1 through Cmp7.

EI11 can reduce the crystal grain diameter of the magnetic grains included in the surface layer of the magnetic recording layer (that is, the fifth magnetic layer) and the neighboring region near the surface layer of the magnetic recording layer. Hence, by using the magnetic recording media

TABLE 1

| | 1st Magnetic Layer | | 2nd Magnetic Layer | | | 3rd Magnetic Layer | 4th Magnetic Layer |
|---|---|---|---|---|---|---|---|
| | Composition | Thickness [nm] | Composition | Thickness [nm] | Sputtering Gas Type | Thickness [nm] | Thickness [nm] |
| EI 1 | FePt—40C | 1 | FePt—40C | 2 | Ar | 3 | 1.4 |
| EI 2 | FePt—40C | 1 | FePt—40C | 2 | Ar | 3 | 1.4 |
| EI 3 | FePt—40C | 1 | FePt—40C | 2 | Ar | 3 | 2 |
| EI 4 | FePt—40C | 1 | FePt—40C | 2 | Ar | 3 | 2.8 |
| EI 5 | FePt—40C | 1 | FePt—40C | 2 | Ar | 3 | 0.7 |
| EI 6 | FePt—40C | 1 | FePt—40C | 2 | Ar | 6 | 0.7 |
| EI 7 | FePt—40C | 1 | FePt—40C | 2 | Ar | 1.5 | 0.7 |
| EI 8 | FePt—40C | 2 | FePt—40C | 2 | Ar | 1.5 | 0.7 |
| EI 9 | FePt—40C | 1 | FePt—40C | 2 | Ar + 2%$H_2$ | 3 | 1.4 |
| EI 10 | FePt—40C | 1 | FePt—40C | 2 | Ar + 2%$H_2$ | 3 | 2.8 |
| EI 11 | FePt—40C | 1 | FePt—40C | 2 | Ar + 2%$H_2$ | 3 | 1.4 |
| Cmp 1 | FePt—40C | 1 | FePt—40C | 4 | Ar | 3 | 1.4 |
| Cmp 2 | FePt—40C | 1 | FePt—40C | 1 | Ar | 3 | 1.4 |
| Cmp 3 | FePt—40C | 3 | FePt—40C | 1 | Ar | 3 | 1.4 |
| Cmp 4 | FePt—16$SiO_2$ | 1 | FePt—30BN | 2 | Ar | 3 | 1.4 |
| Cmp 5 | FePt—16$SiO_2$ | 1 | FePt—12$SiO_2$—10BN | 2 | Ar | 3 | 1.4 |
| Cmp 6 | FePt—16$SiO_2$ | 1 | FePt—8$SiO_2$—16BN | 2 | Ar | 3 | 1.4 |
| Cmp 7 | FePt—16$SiO_2$ | 1 | FePt—16$SiO_2$ | 2 | Ar | 3 | 1.4 |

| | 5th Magnetic Layer | | | | | Protective Layer Rku After Polishing Process |
|---|---|---|---|---|---|---|
| | Thickness [nm] | Crystal Grain Diameter [nm] | Magnetic Grain Spacing [nm] | Area Ratio of (111) Plane and Equivalent Planes Thereof | Rku | |
| EI 1 | 5 | 8.0 | 9.5 | 0.46 | 5.1 | 3.2 |
| EI 2 | 5 | 8.5 | 10.0 | 0.25 | 4.1 | 3.2 |
| EI 3 | 5 | 8.7 | 10.2 | 0.38 | 4.7 | 3.2 |
| EI 4 | 5 | 8.3 | 9.8 | 0.41 | 4.8 | 3.0 |
| EI 5 | 5 | 7.7 | 9.2 | 0.63 | 5.8 | 3.1 |
| EI 6 | 5 | 8.3 | 9.8 | 0.36 | 4.6 | 3.1 |
| EI 7 | 5 | 8.6 | 10.1 | 0.23 | 4.0 | 3.1 |
| EI 8 | 5 | 8.5 | 10.0 | 0.29 | 4.3 | 3.2 |
| EI 9 | 5 | 8.0 | 9.5 | 0.33 | 4.5 | 2.9 |
| EI 10 | 5 | 7.4 | 8.9 | 0.43 | 4.9 | 3.2 |
| EI 11 | 5 | 8.1 | 9.6 | 0.53 | 5.4 | 3.3 |
| Cmp 1 | 5 | 9.5 | 10.8 | 0.86 | 6.9 | 3.9 |
| Cmp 2 | 5 | 9.8 | 11.1 | 0.15 | 3.7 | 3.0 |
| Cmp 3 | 5 | 11.8 | 13.1 | 0.08 | 3.3 | 3.0 |
| Cmp 4 | 5 | 9.4 | 10.7 | 0.09 | 3.4 | 2.9 |
| Cmp 5 | 5 | 9.9 | 11.2 | 0.00 | 2.9 | 2.9 |
| Cmp 6 | 5 | 9.3 | 10.6 | 0.04 | 3.2 | 2.8 |
| Cmp 7 | 5 | 9.9 | 11.2 | 0.14 | 3.6 | 3.1 |

As illustrated in Table 1, the crystal grain diameter of the magnetic grains at the surface of the magnetic recording layer, that is, at the surface of the fifth magnetic layer, is less than or equal to 8.7 nm for each of the exemplary implementations EI1 through EI11. On the other hand, the crystal grain diameter of the magnetic grains at the surface of the magnetic recording layer is greater than or equal to 9.3 nm for each of the comparative examples Cmp1 through Cmp7.

Accordingly, unlike the magnetic recording media according to the comparative examples Cmp1 through Cmp7, the area ratio of the (111) plane and equivalent planes thereof at the surface of the magnetic recording layer of each of the magnetic recording media according to the exemplary implementations EI1 through EI11 falls within a range of 23% to 63%. Accordingly, the magnetic recording media according to the exemplary implementations EI1 through according to the exemplary implementations EI1 through EI11 in the magnetic storage apparatus, the magnetic storage apparatus can exhibit excellent electromagnetic conversion characteristics.

Although the embodiments and exemplary implementations are described as above, the embodiments and exemplary implementations are presented as examples, and the present disclosure is not limited to the embodiments and exemplary implementations. The embodiments may be implemented in various other forms, and various combinations, omissions, substitutions, modifications, variations, or the like may be made without departing from the spirit and scope of the present disclosure.

According to the embodiments described above, it is possible to provide a magnetic recording medium which can include magnetic grains having an extremely small crystal grain diameter at a surface of a magnetic recording layer and in a neighboring region near the surface of the magnetic recording layer.

Further, the present invention is not limited to these embodiments and exemplary implementations, but various combinations, omissions, substitutions, modifications, and variations may be made without departing from the scope of the present disclosure.

What is claimed is:

1. A magnetic recording medium comprising:
a substrate; and
a magnetic recording layer including magnetic grains having an $L1_0$ structure, wherein
the magnetic recording layer is (001) oriented,
a surface of growth of the magnetic recording layer includes a (001) plane, a (111) plane, and planes equivalent to the (111) plane, and
an area ratio of the (111) plane and the planes equivalent to the (111) plane, represented by $(A_{111}+A_{111e})/(A_{001}+A_{111}+A_{111e})$, is in a range of 0.2 to 0.7, where $A_{111}$ denotes an area of the (111) plane, $A_{111e}$ denotes an area of the planes equivalent to the (111) plane, and $A_{001}$ denotes an area of the (001) plane.

2. The magnetic recording medium as claimed in claim 1, wherein the magnetic grains have a crystal grain diameter less than or equal to 8 nm, and include at least one component selected from a group consisting of FePt, CoPt, FePd, and CoPd.

3. A magnetic recording medium comprising:
a substrate; and
a magnetic recording layer including magnetic grains having an $L1_0$ structure, wherein
the magnetic recording layer is (001) oriented,
a surface of growth of the magnetic recording layer includes a (001) plane, a (111) plane, and planes equivalent to the (111) plane, and
a kurtosis Rku at the surface of growth is in a range of 4 to 5.

4. The magnetic recording medium as claimed in claim 3, wherein the magnetic grains have a crystal grain diameter less than or equal to 8 nm, and include at least one component selected from a group consisting of FePt, CoPt, FePd, and CoPd.

5. A magnetic storage apparatus comprising:
the magnetic recording medium according to claim 3; and
a magnetic head, including a first magnetic head element configured to read information from the magnetic recording medium, and a second magnetic head element configured to write information to the magnetic recording medium.

6. A magnetic storage apparatus comprising:
the magnetic recording medium according to claim 1; and
a magnetic head, including a first magnetic head element configured to read information from the magnetic recording medium, and a second magnetic head element configured to write information to the magnetic recording medium.

7. A method for manufacturing a magnetic recording medium, comprising:
forming a (001) oriented magnetic recording layer including magnetic grains having an $L1_0$ structure on a substrate, so that a (001) plane, a (111) plane, and planes equivalent to the (111) plane are formed as a surface of growth, and an area ratio of the (111) plane and the planes equivalent to the (111) plane, represented by $(A_{111}+A_{111e})/(A_{001}+A_{111}+A_{111e})$, is in a range of 0.2 to 0.7, where $A_{111}$ denotes an area of the (111) plane, $A_{111e}$ denotes an area of the planes equivalent to the (111) plane, and $A_{001}$ denotes an area of the (001) plane;
forming a protective film on the magnetic recording layer; and
polishing a surface of the protective film so that a kurtosis Rku thereof is in a range of 2.5 to 3.5.

8. The method for manufacturing the magnetic recording medium as claimed in claim 7, wherein the forming the magnetic recording layer uses magnetic grains having a crystal grain diameter less than or equal to 8 nm, and including at least one component selected from a group consisting of FePt, CoPt, FePd, and CoPd.

9. A method for manufacturing the magnetic recording medium, comprising:
forming a (001) oriented magnetic recording layer including magnetic grains having an $L1_0$ structure on a substrate, so that a (001) plane, a (111) plane, and planes equivalent to the (111) plane are formed as a surface of growth, so that a kurtosis Rku of the surface of growth is in a range of 4 to 5;
forming a protective film on the magnetic recording layer; and
polishing a surface of the protective film so that a kurtosis Rku thereof is in a range of 2.5 to 3.5.

10. The method for manufacturing the magnetic recording medium as claimed in claim 9, wherein the forming the magnetic recording layer uses magnetic grains having a crystal grain diameter less than or equal to 8 nm, and including at least one component selected from a group consisting of FePt, CoPt, FePd, and CoPd.

* * * * *